(12) United States Patent
Takaki (10) Patent No.: US 7,702,334 B2
(45) Date of Patent: Apr. 20, 2010

(54) PREVENTION OF UNNECESSARY HAND-OVER CAUSED BY FADING

(75) Inventor: Tetsuya Takaki, Tokyo (JP)

(73) Assignee: NEC Corporation, Tokyo (JP)

( * ) Notice: Subject to any disclaimer, the term of this patent is extended or adjusted under 35 U.S.C. 154(b) by 883 days.

(21) Appl. No.: 11/316,997

(22) Filed: Dec. 27, 2005

(65) Prior Publication Data

US 2006/0142009 A1     Jun. 29, 2006

(30) Foreign Application Priority Data

Dec. 28, 2004  (JP) .............................. 2004-379584

(51) Int. Cl.
*H04W 36/00*     (2009.01)

(52) U.S. Cl. ...................... 455/436; 370/331; 370/332; 455/550.1

(58) Field of Classification Search ......... 455/436–444; 370/331, 332

See application file for complete search history.

(56) References Cited

U.S. PATENT DOCUMENTS

| 6,754,494 B1 | 6/2004 | Yoshimura |
| 2002/0032033 A1 | 3/2002 | Tamukai |
| 2002/0119779 A1 | 8/2002 | Ishikawa et al. |
| 2003/0142647 A1* | 7/2003 | Agrawal et al. ............. 370/331 |

FOREIGN PATENT DOCUMENTS

| EP | 1 229 754 A | 8/2002 |
| JP | 09-037327 A | 2/1997 |
| JP | 2001-169323 A | 6/2001 |
| JP | 2002-232929 A | 8/2002 |
| JP | 2004-040338 A | 2/2004 |
| JP | 2004-129001 A | 4/2004 |
| WO | WO 98/25429 | 6/1998 |
| WO | WO 01/58182 A2 | 8/2001 |

* cited by examiner

*Primary Examiner*—Dwayne Bost
*Assistant Examiner*—Amancio Gonzalez
(74) *Attorney, Agent, or Firm*—Foley & Lardner LLP (57) ABSTRACT

A hand-over control method is disclosed to control the change of connections between a radio communication terminal and a plurality of radio communication base stations for radio communication. The received power of a signal from a radio communication base station in a cell that that is subject to the influence of fading is likely to vibrate within a predetermined strength range. Even if a cell satisfies hand-over conditions, there is a greater likelihood that the cell is still subject to the influence of fading, if the received power is not exceeding this predetermined range The current received quality of a signal from a radio communication terminal in the cell is compared with last received quality of the signal from the radio communication base station when the radio communication terminal finished radio communication with radio communication base station. If the former quality is not higher than the latter quality by a predetermined level or more, the radio communication base station is determined to still be subject to the influence of fading, and hand-over is not performed. If, on the other hand, the former quality is higher than the latter quality by the predetermined level or more, the radio communication base station is determined not to be subject to the influence of fading, and hand-over is not performed.

14 Claims, 5 Drawing Sheets

PREVENTION OF UNNECESSARY HAND-OVER CAUSED BY FADING

BACKGROUND OF THE INVENTION

1. Field of the Invention

The present invention relates to a method of controlling hand-over (change of radio communication base stations to be connected) performed by a radio communication terminal such as a portable telephone or the like.

2. Description of Related Art

Figure 1:
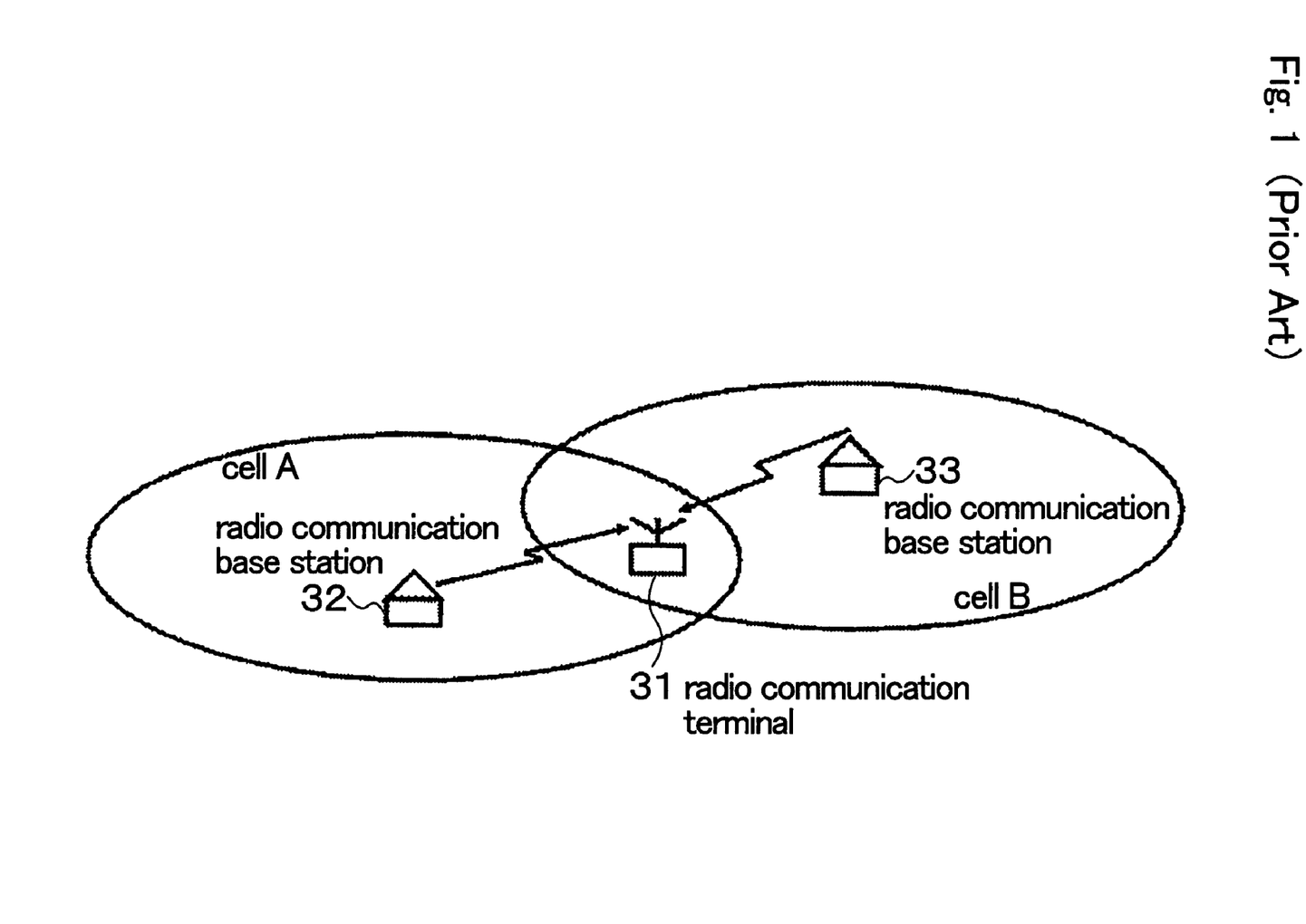
FIG. 1 is a view illustrating hand-over performed in a radio communication terminal.

FIG. 1 is a schematic diagram illustrating a radio communication system to explain hand-over performed by radio communication terminal. In FIG. 1, cell A indicates an area in which radio communication terminal 31 can perform a radio communication with radio communication base station 32, and cell B indicates an area in which radio communication terminal 31 can perform a radio communication with radio communication base station 33. Hand-over performed by radio communication terminal 31 refers to an operation in which radio communication terminal 31 which is communicating with radio communication base station 32 change radio communication with radio communication base station 32 to radio communication with radio communication base station 33 when radio communication terminal 31 moves from cell A to cell B, When performing hand-over from radio communication base station 32 to radio communication base station 33, radio communication terminal 31 is required to change the frequency used for radio communication from a frequency available in radio communication base station 32 to a frequency available in radio communication base station 33.

Such inconvenience can be solved by using code division multiple access (CDMA) for radio communication. In a CDMA system, radio communication terminal 31 can distinguish between a signal transmitted from radio communication base station 32 and a signal transmitted from radio communication base station 33 and can simultaneously receive both signals. Therefore, with the hand-over performed by radio communication terminal 31 using CDMA, when radio communication terminal 31 moves from cell A to cell B while communicating with radio communication base station 32, radio communication terminal 31 adds communication with radio communication base station 33 while maintaining the communication with radio communication base station 32, radio communication terminal 31 being set to have simultaneous reception from both radio communication base stations 32 and 33. Thereafter, when the received power of signals transmitted from radio communication base station 32 becomes low, radio communication terminal 31 finishes the communication with radio communication base station 32 and communicates only with radio communication base station 33.

A radio communication terminal using such CDMA includes a plurality of receivers called a finger receiver and hence has the capability to simultaneously receive signals transmitted from three radio communication base stations. This feature of simultaneous reception allows hand-over in a radio communication terminal using CDMA to be classified into three general cases: (i) When communicating with one or two radio communication base stations, the radio communication terminal adds communication with another radio communication base station; (ii) When communicating with two or three radio communication base stations, the radio communication terminal finishes the communication with these radio communication base stations; (iii) When communicating with three radio communication base stations, the radio communication terminal changes communication with one of the radio communication base stations to communication with another radio communication base station that is not currently communicating with the radio communication terminal.

The processing in case (iii), which has the most problems of the three cases, will be described in detail with reference to FIG. 2.

Figure 2:
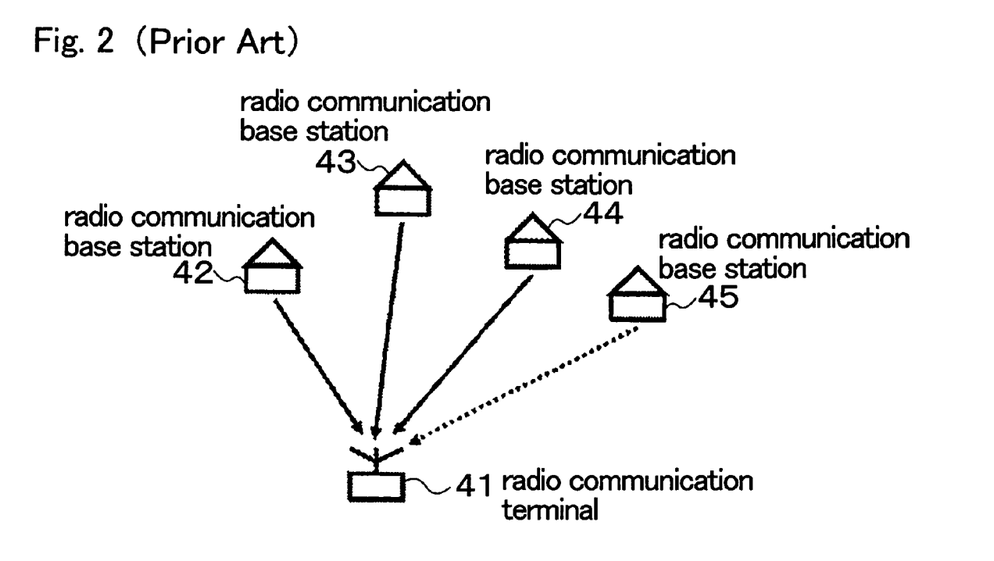
FIG. 2 is a view illustrating that when communicating with three radio communication base stations, a radio communication terminal switches its communication with a radio communication base station into a communication with another radio communication base station not currently communicating with the terminal, and more specifically, when radio communication terminal 41 communicates with radio communication base stations 42, 43 and 44, radio communication base station 45 has become a candidate for hand-over.
Figure 3:
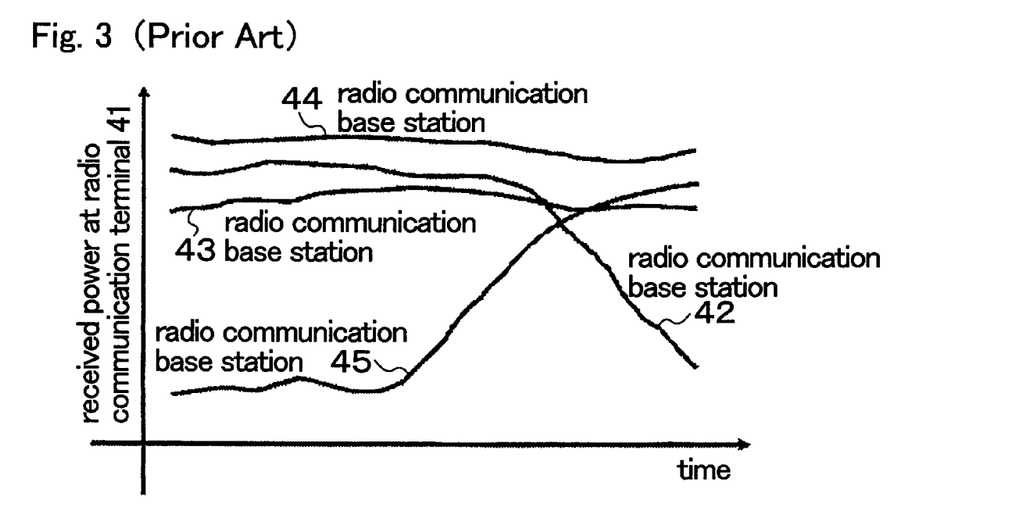
FIG. 3 is a view illustrating that when communicating with three radio communication base stations, a radio communication terminal switches its communication with a radio communication base stations into a communication with another radio communication base station not currently communicating with the terminal, and in particular, a change in received power with time of signals received by radio communication terminal 41.
Figure 4:
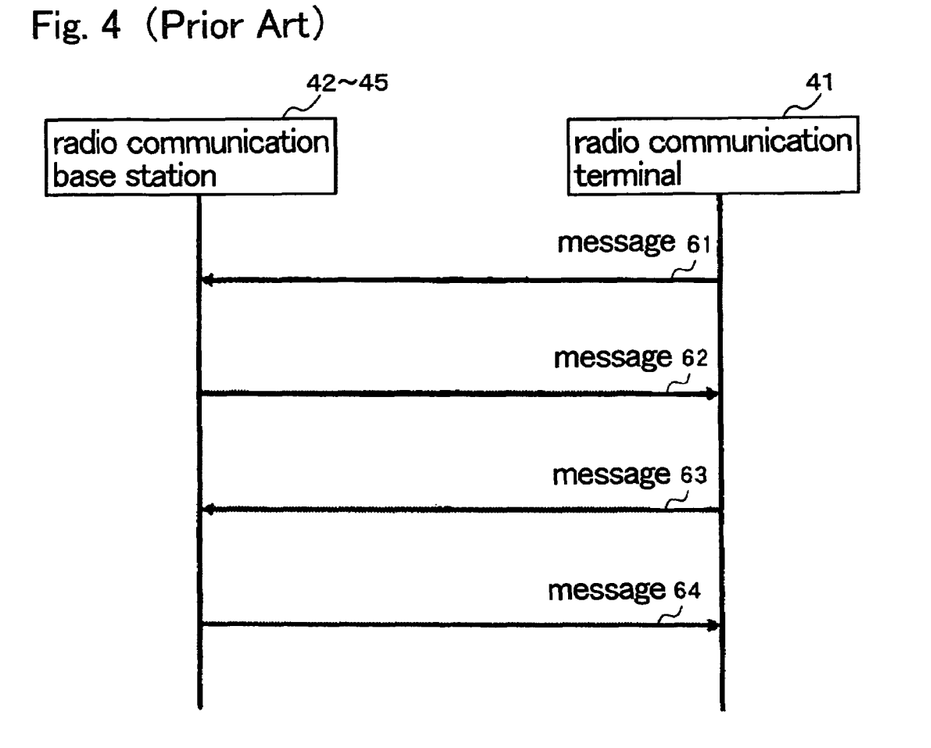
FIG. 4 is a view illustrating that when communicating with three radio communication base stations, a radio communication terminal switches its communication with a radio communication base stations into a communication with another radio communication base station not currently communicating with the terminal, and in particular, a sequence of messages exchanged during hand-over between the radio communication terminal and the radio communication base stations.

FIG. 2 shows that when radio communication terminal 41 is communicating with radio communication base stations 42, 43 and 44, radio communication base station 45 becomes a candidate for hand-over with which radio communication terminal 41 starts communication. FIG. 3 shows a change in the received power of radio communication terminal 41 over time. FIG. 4 shows a sequence of messages exchanged between radio communication terminal 41 and radio communication base stations 42 to 45.

As shown in FIG. 2, radio communication terminal 41 is communicating with radio communication base stations 42, 43 and 44. Radio communication terminal 41 measures the received power of a signal transmitted from radio communication base station 45 during communication, As shown in FIG. 3, the received power of a signal transmitted from radio communication base station 42 is lowered, whereas the received power of a signal transmitted from radio communication base station 45 is increased. As shown in FIG. 4, immediately before the received power of a signal from radio communication base station 45 exceeds the received power of a signal from radio communication base station 42, radio communication terminal 41 transmits message 61 to radio communication base stations 42, 43 and 44 to notify the stations that the result of measurement of the received power of a signal transmitted from radio communication base station 45 satisfies the conditions for hand-over.

Upon receipt of message 61, radio communication base station 42 finishes communication with radio communication terminal 41, and radio communication base station 45 starts communication with radio communication terminal 41. Each of radio communication base stations 43 and 44 transmits message 62 to radio communication terminal 41 to notify the terminal of conditions to communicate with radio communication base station 45 that is a target for hand-over, such as timing and the like.

Upon receipt of message 62, radio communication terminal 41 sets the notified timing information and the like to the finger receivers thereof, and transmits message 63 to radio communication base stations 43, 44 and 45 to notify the base stations that procedure to set the notified communication conditions has been finished.

Subsequently, in preparation for the next hand-over, each of radio communication base stations 43, 44 and 45 transmits message 64 to radio communication terminal 41 to cause terminal 41 to renew hand-over information such as information about the periphery cells of terminal 41 and the like, thereby finishing the hand-over processing. Radio communication terminal 41 then examines the qualities of signals received from radio communication base stations in the peripheral cells in accordance with received massage 64 to renew hand-over information.

Figure 5:
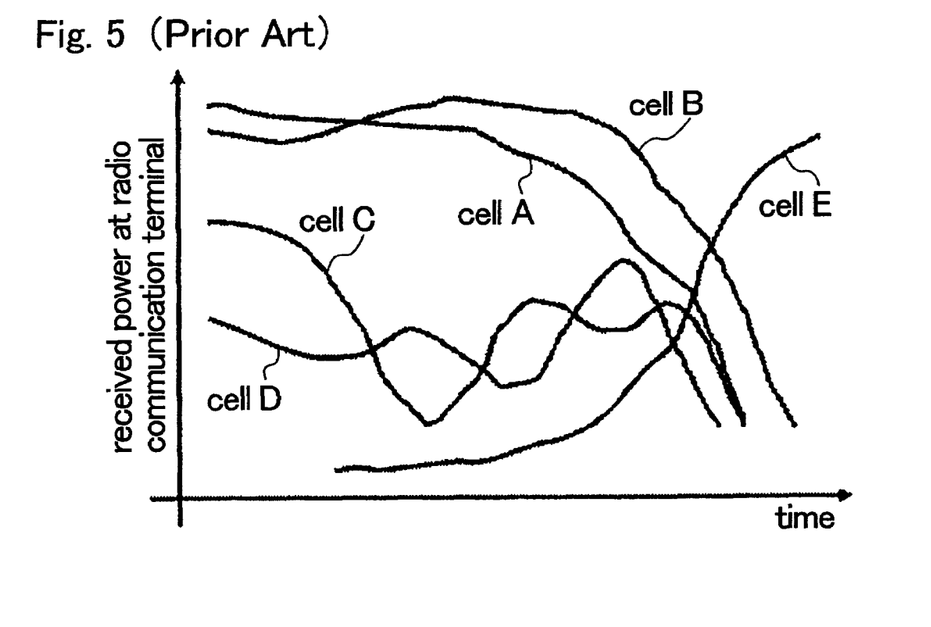
FIG. 5 is a view showing a change in received power over time in a radio communication terminal when it moves to respective cells A to E.

In radio communications, fading may occur due to buildings and geographical features, causing fluctuation of the received power from each radio communication base station. This fading exerts a large influence on the processing for the case (iii). FIG. 5 explains the influence exerted on the processing for the case (iii).

As shown in FIG. 5, qualities of signals received from radio communication base stations may change greatly over time as in cell C or cell D. Now consider hand-over which is performed under radio signal propagation circumstances as shown in FIG. 5. Initially, radio communication terminal 41 communicates with the radio communication base stations in cells A, B and C. Each time the relationship in the qualities of received signals between cells C and D alternates, radio communication terminal 41 performs hand-over to switch between the radio communication base stations in cells C and D. Thereafter, when the qualities of received signals from the radio communication base stations in cells A and B deteriorate and the qualities of received signals from the radio communication base station in cell E is increased, the radio communication base station in cell E becomes a candidate for hand-over. However, because radio communication terminal 41 performs hand-over to switch between the radio communication base stations in cells C and D, it cannot perform hand-over to the radio communication base station in cell E. This causes a problem that a call is undesirably disconnected due to the deterioration of the qualities of received signals from the radio communication base stations in cells A and B.

The reason that hand-over to the radio communication base station in cell E can not be performed is that since the sequence of hand-over is being performed between radio communication terminal 41 and the radio communication base stations in order to perform hand-over to switch between the radio communication base stations in cells C and D, as illustrated in FIG. 5. message 61 which notifies that cell E has satisfied the hand-over conditions and which is transmitted from radio communication terminal 41 to the radio communication base stations, is disregarded by the radio communication base stations. In this way, in situations where hand-over to switch between two cells C, D is frequently performed, the hand-over that is necessary to maintain communications with radio communication terminal 41 cannot be performed due to unnecessary hand-over that has been frequently performed.

Several techniques have been proposed to solve this problem. For example, JP 2001-16932A (hereinafter referred to as Patent document 1) discloses a technique to detect such unnecessary hand-over through a learning means. JP2004-40338A (hereinafter referred to as Patent document 2) discloses a technique wherein the number of hand-over operations between two radio communication base stations is counted, and hand-over between the radio communication base stations is prohibited for a predetermined period of time when the counted value exceeds a predetermined value.

However, with the invention of Patent document 1, it is time-consuming to build the learning means, and unnecessary hand-over caused by fading cannot be prevented in a simple manner. With the invention of Patent document 2, the repetition of unnecessary hand-over a predetermined number of times cannot be avoided.

SUMMARY OF THE INVENTION

It is an object of the present invention is to provide a method of preventing unnecessary hand-over caused by fading in an effective and simple manner.

To this end, the method according to the present invention is intended to prevent unnecessary hand-over caused by fading in the following procedure.

First, when a radio communication terminal executes a first hand-over operation, on the basis of the qualities of signals received from a plurality of radio communication base stations, to change or finish connections between the radio communication terminal and at least part of the radio communication base stations for radio communication, the radio communication terminal stores identifiers of radio communication base station(s), with which the radio communication terminal finished radio communication, and information about the qualities of signals received from said radio communication base station(s) when the radio communication terminal finished radio communication with said radio communication base station(s).

Then, when the radio communication terminal executes a second hand-over operation, on the basis of the qualities of signals received from the radio communication base stations, to change connections between the radio communication terminal and at least part of the radio communication base stations for radio communication, the radio communication terminal determines whether or not a particular radio communication base station with which the radio communication terminal is about to start communicating, was previously put in radio communication with the radio communication terminal, based on the presence or absence of the identifier of the particular radio communication base station;

If the radio communication terminal has determined that the particular radio communication base station was previously put in radio communication with the radio communication terminal, the radio communication terminal compares the quality of a first signal currently received from the particular radio communication base station with the quality of a second signal received from the particular radio communication base station stored at the first hand-over when the radio communication terminal finished the radio communication with the particular radio communication base station. If the quality of the first signal is higher than the quality of the second signal by a predetermined level or more, the radio communication terminal executes the second hand-over operation to start radio communication with the particular radio communication base station.

As exemplified by cells C and D shown in FIG. 5, in cells that are subject to the influence of fading, the received power is likely to fluctuate or vibrate within a predetermined strength range. Therefore, even though the conditions for hand-over are satisfied, unless the strength of the received power does not exceed the predetermined strength range, there is a greater likelihood that the cell does not yet get out of the influence of fading. In the present invention, the quality (received power) of a signal currently received from a radio communication base station is compared with the quality (received power) of a signal finally received from the radio communication base station when the radio communication base station finished radio communication with the radio communication terminal. If the former quality does not exceed the latter quality by a predetermined level, it is determined that the cell do not yet get out of the influence of fading, and hand-over is not performed. On the other hand, if the former quality exceeds the latter quality by a predetermined level or more, it is determined that the cell has got out of the influence of fading, and hand-over is performed.

Thus, according to the present invention, the use of the algorithm based on the properties of fading that the received power is fluctuated within a predetermined strength range, prevents unnecessary hand-over caused by fading in an effective and simple manner, thereby preventing the failure to perform necessary hand-over and therefore disconnection of communication The above and other objects, features and advantages of the present invention will become apparent from the following description with reference to the accompanying drawings which illustrate examples of the present invention.

DETAILED DESCRIPTION OF THE PREFERRED EMBODIMENTS

Figure 6:
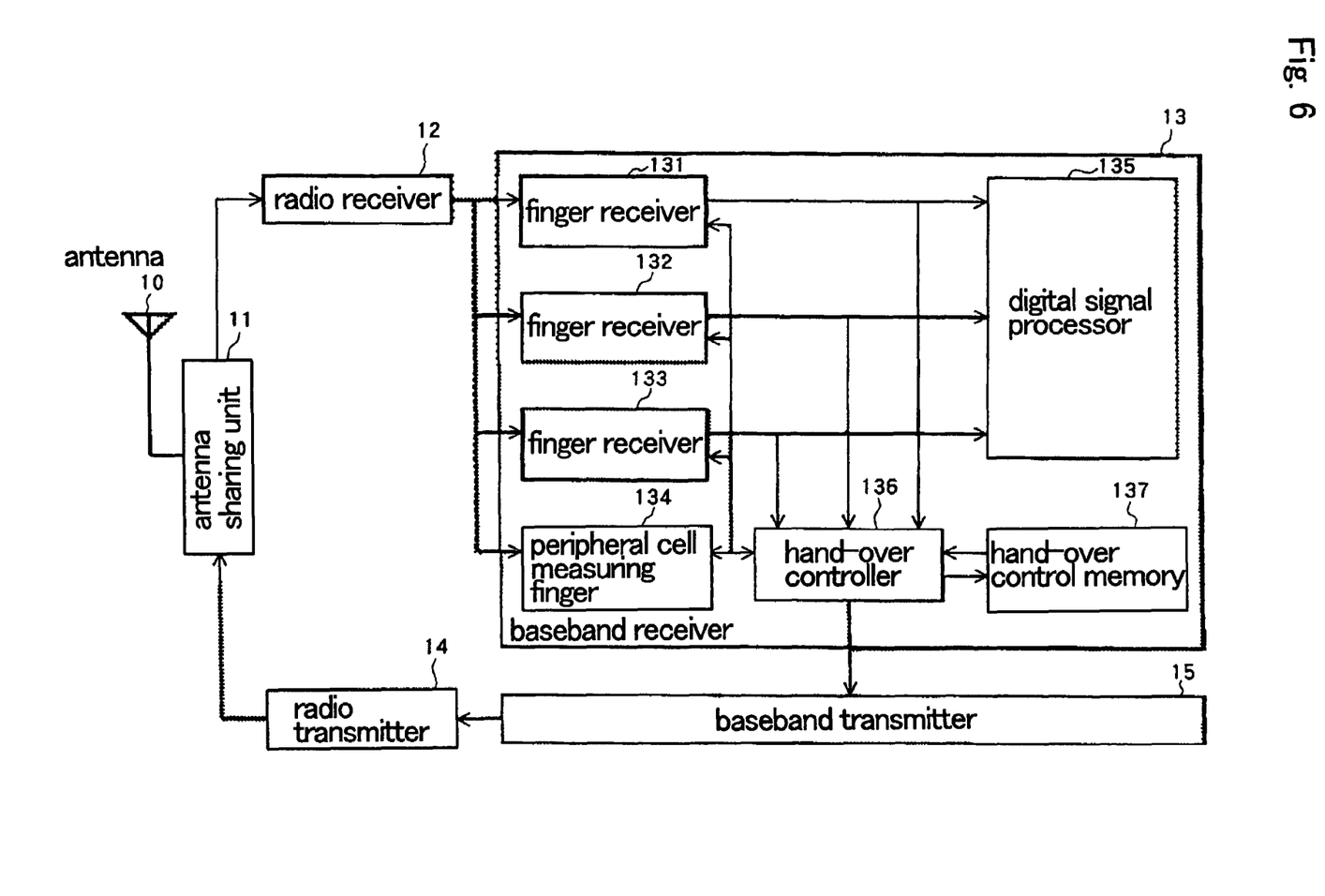
FIG. 6 is a view showing an arrangement of a radio communication terminal according to an embodiment of the present invention.

Referring now to FIG. 6, a radio communication terminal according to an embodiment of the present invention comprises antenna 10, antenna sharing unit 11, radio receiver 12, baseband receiver 13, radio transmitter 14, and base band transmitter 15. Baseband receiver 13 includes a plurality of finger receivers 131, 132 and 133, peripheral cell measuring finger receiver 134, digital signal processor 135, hand-over controller 136, and hand-over control memory 137.

Antenna 10 receives and transmits signals for communication with radio communication base stations (not shown).

Antenna sharing unit 11 supplies the signal received by antenna 10 to radio receiver 12 and outputs to antenna 10 a transmission signal of the radio communication terminal that is output from radio transmitter 14.

Radio receiver 12 performs radio processing such as frequency conversion and the like on the received signal to supply the resultant signal as a received signal within a baseband to baseband receiver 13.

Baseband receiver 13 performs processing such as despreading, demodulation and the like on the received signal from radio receiver 12 in finger receivers 131, 132 and 133 and peripheral cell measuring finger receiver 134, supplies the processed signal to digital signal processor 135, and reports the received quality of the received signal to hand-over controller 136.

Hand-over controller 136 controls the timing of signal reception in finger receivers 131, 132, 133 and peripheral cell measuring finger receiver 134, and determines from the received qualities of signals transmitted from a radio communication base station currently communicating with the terminal and the received qualities of signals transmitted from radio communication base station(s) in peripheral cell(s) not currently communicating with the terminal whether or not the conditions for hand-over are satisfied in each cell. If hand-over conditions are satisfied in a particular radio communication base station in the peripheral cells, hand-over controller 136 retrieves the results of hand-over for the particular radio communication base station previously performed from hand-over control memory 137 and determines whether or not the particular radio communication base station that has satisfied the hand-over conditions was a target for hand-over to change or finish connections between the radio communication terminal and radio communication base stations for radio communication. If the particular radio communication base station was not a target for hand-over, hand-over controller 136 notifies baseband transmitter 15 that the particular radio communication base station has satisfied the hand-over conditions. The radio communication terminal transmits a message to notify that the particular radio communication base station has satisfied the hand-over conditions, to the radio communication base stations, according to a hand-over sequence shown in FIG. 4. Thereafter, hand-over controller 136 returns to the processing to determine, based on the received qualities of signals received from radio communication base station currently communicating with the terminal and the received qualities of signals received from radio communication base stations in the peripheral cells, whether or not each radio communication base station satisfies the hand-over conditions.

On the other hand, if the particular radio communication base station was previously a target for hand-over, hand-over controller 136 determines whether or not the particular cell has communicated with the radio communication terminal under circumstances where unnecessary hand-over frequently occurs due to fluctuations in the received quality of signals from the particular radio communication base station that are caused by fading. Specifically, hand-over controller 136 compares the received quality of signals from the particular radio communication base station in the previous hand-over with the received quality of the particular radio communication base station in the current hand-over. The received quality in the previous hand-over was finally received from the particular radio communication base station, when communication with the particular cell was finished in the previous hand-over, and has been stored in hand-over control memory 137. If the received quality of signals in the current hand-over is almost equal to the received quality in the previous hand-over, that is, if the received quality of signals in the current hand-over is not higher than the received quality of signals in the previous hand-over by a predetermined level, then hand-over controller 136 determines that fading has exerted an influence on communication with the particular radio communication base station, frequently generating an unnecessary hand-over. To reduce this unnecessary hand-over, hand-over controller 136 stops the current hand-over for the particular radio communication base station, and hand-over controller 136 returns to the processing to determine, based on the received qualities of signals from a radio communication base station currently communicating with the terminal and the received qualities of signals from radio communication base station in the peripheral cells, whether or not each radio communication base station satisfies the hand-over conditions.

On the other hand, if the received quality in the current hand-over is improved as compared with the received quality in the previous hand-over by a level equal to or higher than a threshold level stored in hand-over control memory 137, hand-over controller 136 determines that although fluctuations in the received quality of signals from the particular radio communication base station occurs due to fading, the particular radio communication base station has not been put into a condition to frequently generate unnecessary hand-over, and notifies baseband transmitter 15 that the particular radio communication base station has satisfied the hand-over conditions. The radio communication terminal then notifies radio communication base stations that the particular radio communication base station has satisfied the hand-over conditions, according to the hand-over sequence shown in FIG. 4, Thereafter, hand-over controller 136 returns to the processing to determine, based on the received qualities of signals from the radio communication base station currently communicating with the terminal and the received qualities of signals from radio communication base stations in the peripheral cells, whether or not each radio communication base station satisfies the hand-over conditions.

Digital signal processor 135 performs digital signal processing such as error correction and the like on the signal that was received and inputted, decodes the received signal, and extracts, from the received signal, data such as audio data, image data and the like that were transmitted from the radio communication base stations.

Radio transmitter 14 performs radio processing such as frequency conversion and the like on the transmission signal generated in the baseband transmitter 15.

Baseband transmitter 15 generates a transmission signal of the radio communication terminal.

Figure 7:
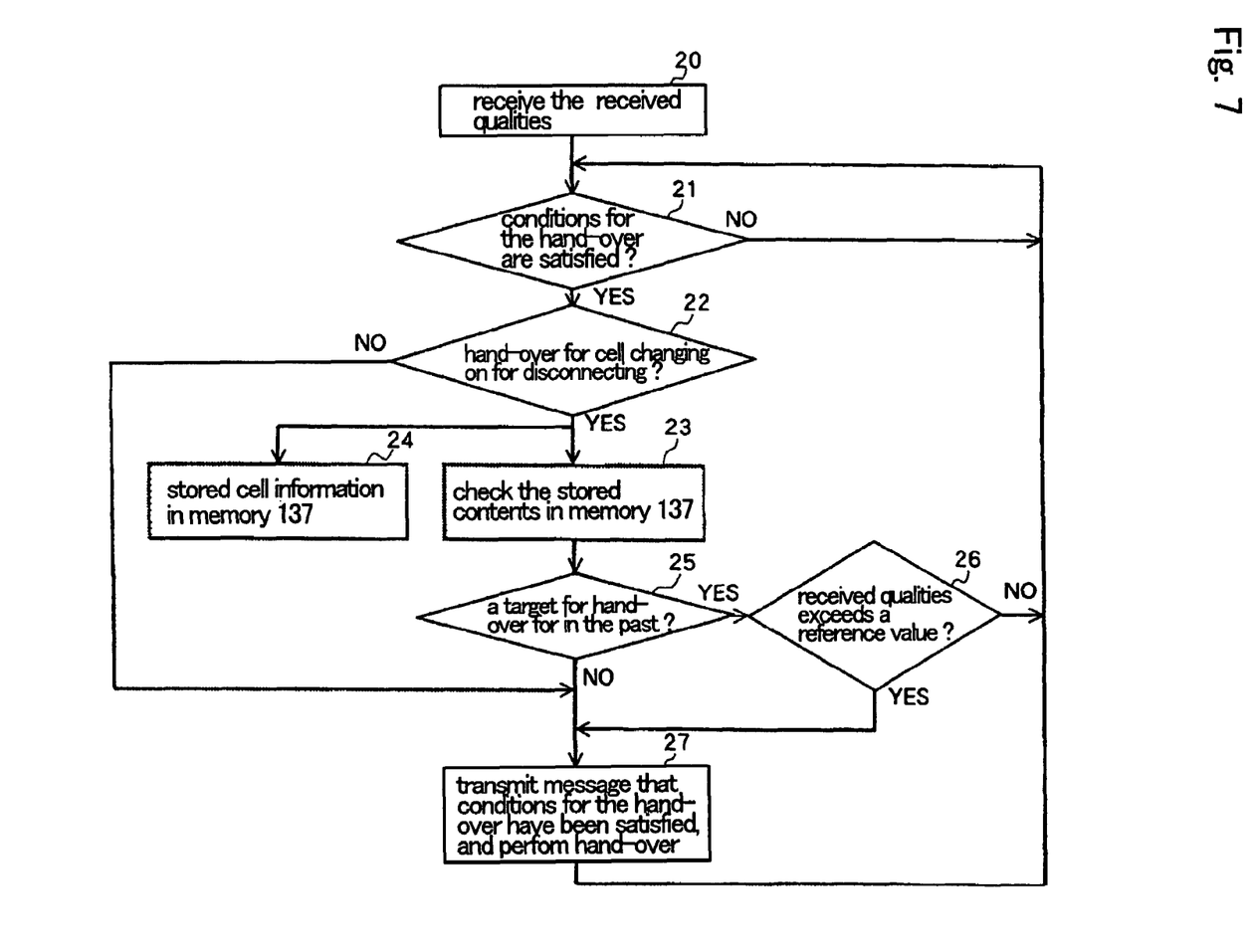
FIG. 7 is a flow chart for explaining procedure of the hand-over control method according to an embodiment of the present invention.

Next, procedure of a hand-over control method performed in hand-over controller 136 of the radio communication terminal shown in FIG. 6 will be described in detail with reference to FIG. 7.

On receipt of information about the received qualities of signals from finger receivers 131, 132 and 133 and peripheral cell measuring finger receiver 134 at step 20, hand-over controller 136 determines at step 21 whether or not the received qualities of the input signals satisfy the hand-over conditions. If the received qualities do not satisfy the hand-over conditions, that is, in the case of NO at step 21, hand-over controller 136 waits for the received quality of the next signal.

On the other hand, if the received qualities satisfy the hand-over conditions, that is, in case of YES at step 21, hand-over controller 136 determines at step 22 whether hand-over should be performed to switch communication with a radio communication base station currently communicating with the terminal to communication with a radio communication base station not currently communicating with the terminal (cell changing) or only to disconnect a radio communication base station currently communicating with the terminal from communication with the terminal. For hand-over other than hand-over for cell changing or for disconnecting, that is, hand-over that adds a cell (in case of NO at step 22), hand-over controller 136 notifies at step 27, according to the hand-over sequence shown in FIG. 4, radio communication base stations that a cell to be added has satisfied the hand-over conditions, and then performs hand-over processing according to the hand-over sequence shown in FIG. 4 to start communication between a radio communication base station in the added cell and the terminal. Thereafter, hand-over controller 136 waits for the received qualities of the next signal in order to perform the next hand-over operation.

On the other hand, in case of hand-over for cell changing or for disconnecting, that is, in case of YES at step 22, the procedure proceeds to steps 23 and 24.

At step 24, hand-over controller 136 stores in hand-over control memory 137 the cell number of a cell whose radio communication base station is to be disconnected from communication with the terminal, and the received quality of signals finally transmitted from the radio communication base station at the completion of the communication with the terminal along with the identifier of the radio communication base station. Data stored in hand-over control memory 137 are periodically renewed. At step 23, hand-over controller 136 ascertains data stored in hand-over control memory 137. More particularly, hand-over controller 136 searches hand-over control memory 137 for an identifier and a received quality of the radio communication base station.

At step 25, hand-over controller 136 determines whether or not the particular radio communication base station that is a target for hand-over with which the radio communication terminal is about to start communication, was previously disconnected from communication with the terminal for cell changing or for disconnecting, from the presence or absence of the identifier of the particular radio communication base station. If there is the identifier in hand-over control memory 137, then the hand-over controller 136 determines that the particular radio communication base station was disconnected in a previous hand-over. In contrast, if there is no identifier of the particular radio communication base station in hand-over control memory 137, then hand-over controller 136 determines that the particular radio communication base station was not disconnected in the previous hand-over.

If the particular radio communication base station was not disconnected in the previous hand-over, that is, in case of NO at step 25, hand-over controller 136 notifies, according to the hand-over sequence shown in FIG. 4, the radio communication base stations that the particular radio communication base station has satisfied the hand-over conditions, and performs hand-over processing shown in FIG. 4 to start communication between the radio communication terminal and the particular radio communication base station. Thereafter, hand-over controller 136 waits for the received qualities of the next signal in order to perform next hand-over operation.

On the other hand, if the particular radio communication base station was disconnected in previous hand-over, that is, in the case of YES at step 25, hand-over controller 136 compares, at step 26, the received quality of a signal currently transmitted from the particular radio communication base station with the received quality of a signal finally transmitted from the particular radio communication base station at the competition of the communication with the terminal and stored in hand-over control memory 137, and determines based on the result of comparison whether or not the current hand-over should be performed to start communication with the particular radio communication base station.

Specifically, if the former received quality is almost the same as the latter received quality, hand-over controller 136 can recognize that the received quality of the particular radio communication base station fluctuates due to fading to thereby frequently generate unnecessary hand-over for the particular radio communication base station, to determine that the current hand-over for connection of the particular radio communication base station with the terminal should not be performed. However, if the former received quality is higher than the latter receive quality by a predetermined level, then hand-over controller 136 can recognize that the particular radio communication base station is not in a condition to frequently generate unnecessary hand-over due to fluctuations in the received quality of the particular cell. In order to perform this procedure, hand-over controller 136 stores a threshold value in hand-over control memory 137 to compare the former received quality with the latter received quality, and compares the former received quality with the latter received quality by using the predetermined value to determine whether or not the former received quality is improved as compared with the latter received quality by the predetermined level or more.

If the comparison shows that the former received quality is not improved by the predetermined level or more, that is, in case of NO at step 26, then hand-over controller 136 waits for the received qualities of the next signal at step 20. However, the comparison shows that the former received quality is improved by the predetermined level or more, that is, in case of YES at step 26, then hand-over controller 136 notifies, according to the hand-over sequence shown in FIG. 4, radio communication base stations that the particular radio communication base station has satisfied the hand-over conditions. Subsequently, at step 27, hand-over controller 136 performs hand-over processing shown in FIG. 4 to start communication with the particular radio communication base station. Thereafter, at step 20, hand-over controller 136 waits for the received qualities of the next signal in order to perform next hand-over operation.

According to another embodiment of the present invention, a radio communication terminal has the same basic construction as in the previous embodiment, but differs from the previous embodiment in the processing performed in hand-over controller 136. That is, hand-over controller 136 in the present embodiment stores a predetermined threshold level for received qualities in hand-over control memory 137, and even if a particular cell can be a target for hand-over, hand-over controller 136 does not handle the particular cell as a target for hand-over when the received quality of the particular cell is below the predetermined threshold level. This therefore eliminates the need for performing processing after step 20 in FIG. 7 when the received quality is too low, According to yet another embodiment of the present invention, the processing to determine whether hand-over operation is performed or not, i.e., the processing of steps 25 and 26 in FIG. 6 is carried out in a radio communication base station.

Specifically, after measuring the received quality in each cell, the radio communication terminal transmits to the radio communication base station, a message notifying that a particular cell has satisfied the hand-over conditions, together with information about the received qualities. Based on the message transmitted, the radio communication base station determines whether or not a radio communication base station in the particular cell that is a target for hand-over was previously a target for hand-over for cell changing or for disconnecting from communication and finished the communication with the radio communication terminal. If the radio communication base station in the particular cell was previously disconnected from communication with the terminal to finish the radio communication terminal, then the radio communication base station compares the received quality at the completion of communication with the received quality notified to determine whether the current hand-over should be continued or not. Please note that the radio communication base station includes a memory for storing the received quality that corresponds to hand-over control memory 137.

The radio communication terminal and the radio communication base station described above each may be implemented, other than by a dedicated hardware, by recording a computer program to embody its function on a computer-readable recording medium and executing the program on a computer serving as the radio communication terminal or the radio communication base station. The computer-readable recording medium refers to a flexible disk, a magneto-optical disk, a recording medium such as CD-ROM or the like, a memory such as a hard disk installed in a computer system, or the like. Further, the computer-readable recording medium includes a medium (transmission medium, transmitted waves or carrier waves) for dynamically holding a program in a short period of time such as, for example, in a case where a program is transmitted through the Internet, and a medium for holding a program for a fixed period of time such as a volatile memory installed in a computer system.

While preferred embodiments of the present invention have been described using specific terms, such description is for illustrative purposes only, and it is to be understood that changes and variations may be made without departing from the spirit or scope of the following claims.

What is claimed is:

1. A method of controlling hand-over to change connections between a radio communication terminal and a plurality of radio communication base stations for radio communication, the method comprising the steps of:
    (a) when the radio communication terminal executes a first hand-over operation, on the basis of the qualities of signals received from the radio communication base stations, to finish connections between the radio communication terminal and at least part of the radio communication base stations for radio communication, storing identifiers of radio communication base station(s), with which the radio communication terminal finished radio communication, and information about the qualities of signals received from said radio communication base station(s) when the radio communication terminal finished radio communication with said radio communication base station(s);
    (b) when the radio communication terminal executes a second hand-over operation, on the basis of the qualities of signals received from the radio communication base stations, to start communication between the radio communication terminal and at least part of the radio communication base stations for radio communication, determining whether or not a particular radio communication base station with which the radio communication terminal is about to start communicating, was previously put in radio communication with the radio communication terminal, based on the presence or absence of the identifier of the particular radio communication base station;
    (c) if the radio communication terminal has determined at step (b) that the particular radio communication base station was previously put in radio communication with the radio communication terminal, comparing the quality of a first signal currently received from the particular radio communication base station with the quality of a second signal received from the particular radio communication base station stored at step (a) when the radio communication terminal finished the radio communication with the particular radio communication base station; and
    (d) if the quality of the first signal is higher than the quality of the second signal by a predetermined level or more, notifying the particular radio communication base station that the particular communication base station satisfies handover conditions and if the quality of the first signal is not higher than the quality of the second signal by a predetermined level stopping the handover process for the particular radio communication base station.

2. The method according to claim 1, further comprising the steps of:
   (e) determining in the radio communication terminal whether or not the quality of the first signal received from the particular radio communication base station exceeds a predetermined threshold level; and
   (f) if the radio communication terminal has determined at step (e) that the quality of the first signal received from the particular radio communication base station is not higher than the predetermined threshold level, finishing said second hand-over operation without performing steps (b), (c) and (d).

3. A method of controlling hand-over to change connections between a radio communication terminal and a plurality of radio communication base stations for radio communication, the method comprising the steps of:
   (a) when one of the radio communication base stations receives from the radio communication terminal information about the qualities of signals received from the plurality of radio communication base stations and executes a first hand-over operation, on the basis of said information, to finish connections between the radio communication terminal and at least part of the radio communication base stations for radio communication, storing identifiers of radio communication base station(s), with which the radio communication terminal has finished radio communication, and information about the qualities of signals received from said radio communication base station(s) when the radio communication terminal has finished radio communication with said radio communication base station(s);
   (b) when one of the radio communication base stations receives from the radio communication terminal information about the qualities of signals received from the radio communication base stations and executes a second hand-over operation, on the basis of said information, to start communication between the radio communication terminal and at least part of the radio communication base stations for radio communication, determining whether or not a particular radio communication base station with which the radio communication terminal is about to start communicating, was previously put in radio communication with the radio communication terminal, based on the presence or absence of the identifier of the particular radio communication base station;
   (c) if the one of the radio communication base stations has determined at step (b) that the particular radio communication base station was previously put in radio communication with the radio communication terminal, comparing the quality of a first signal currently received from the particular radio communication base station with the quality of a second signal received from the particular radio communication base station stored at step (a) when the radio communication terminal has finished the radio communication with the particular radio communication base station; and
   (d) if the quality of the first signal is higher than the quality of the second signal by a predetermined level or more, executing said second hand-over operation in the radio communication terminal to start radio communication with the particular radio communication base station.

4. The method according to claim 3, further comprising the steps of
   (e) determining in the one of the radio communication base stations whether or not the quality of the first signal received from the particular radio communication base station exceeds a predetermined threshold level; and
   (f) if the one of the radio communication base stations has determined at step (e) that the quality of the first signal received from the particular radio communication base station is not higher than the predetermined threshold level, finishing said second hand-over operation without performing steps (b), (c) and (d).

5. A computer readable medium storing program instructions for enabling a computer to perform control of hand-over to change connections between a radio communication terminal and a plurality of radio communication base stations for radio communication, the computer program comprising instructions of:
   (a) when the radio communication terminal executes a first hand-over operation, on the basis of the qualities of signals received from the radio communication base stations, to finish connections between the radio communication terminal and at least part of the radio communication base stations for radio communication, storing identifiers of radio communication base station(s), with which the radio communication terminal finished radio communication, and information about the qualities of signals received from said radio communication base station(s) when the radio communication terminal finished radio communication with said radio communication base station(s);
   (b) when the radio communication terminal executes a second hand-over operation, on the basis of the qualities of signals received from the radio communication base stations, to start communication between the radio communication terminal and at least part of the radio communication base stations for radio communication, determining whether or not a particular radio communication base station with which the radio communication terminal is about to start communicating, was previously put in radio communication with the radio communication terminal, based on the presence or absence of the identifier of the particular radio communication base station;
   (c) if the radio communication terminal has determined by software instruction (b) that the particular radio communication base station was previously put in radio communication with the radio communication terminal, comparing the quality of a first signal currently received from the particular radio communication base station with the quality of a second signal received from the particular radio communication base station stored by software instruction (a) when the radio communication terminal finished the radio communication with the particular radio communication base station; and
   (d) if the quality of the first signal is higher than the quality of the second signal by a predetermined level or more, executing said second hand-over operation in the radio communication terminal to start radio communication with the particular radio communication base station.

6. The computer readable medium according to claim 5, further comprising the instructions of:
   (e) determining in the radio communication terminal whether or not the quality of the first signal received from the particular radio communication base station exceeds a predetermined threshold level; and (f) if the radio communication terminal has determined by software instruction (e) that the quality of the first signal received from the particular radio communication base station is not higher than the predetermined threshold level, finishing said second hand-over operation without performing software instructions (b), (c) and (d).

7. A computer readable medium storing program instructions for enabling a computer to perform control hand-over to change connections between a radio communication terminal and a plurality of radio communication base stations for radio communication, the computer program comprising the instructions of:
  (a) when one of the radio communication base stations receives from the radio communication terminal information about the qualities of signals received from the plurality of radio communication base stations and executes a first hand-over operation, on the basis of said information, or finish connections between the radio communication terminal and at least part of the radio communication base stations for radio communication, storing identifiers of radio communication base station(s), with which the radio communication terminal has finished radio communication, and information about the qualities of signals received from said radio communication base station(s) when the radio communication terminal has finished radio communication with said radio communication base station(s);
  (b) when one of the radio communication base stations receives from the radio communication terminal information about the qualities of signals received from the radio communication base stations and executes a second hand-over operation, on the basis of said information, to start communication between the radio communication terminal and at least part of the radio communication base stations for radio communication, determining whether or not a particular radio communication base station with which the radio communication terminal is about to start communicating, was previously put in radio communication with the radio communication terminal, based on the presence or absence of the identifier of the particular radio communication base station;
  (c) if the one of the radio communication base stations has determined by software instruction (b) that the particular radio communication base station was previously put in radio communication with the radio communication terminal, comparing the quality of a first signal currently received from the particular radio communication base station with the quality of a second signal received from the particular radio communication base station stored by software instruction (a) when the radio communication terminal has finished the radio communication with the particular radio communication base station; and
  (d) if the quality of the first signal is higher than the quality of the second signal by a predetermined level or more, executing said second hand-over operation in the radio communication terminal to start radio communication with the particular radio communication base station.

8. The computer readable medium according to claim 7, further comprising the instructions of:
  (e) determining in the one of the radio communication base stations whether or not the quality of the first signal received from the particular radio communication base station exceeds a predetermined threshold level; and
  (f) if the one of the radio communication base stations has determined by software instruction (e) that the quality of the first signal received from the particular communication base station is not higher than the predetermined threshold level, finishing said second hand-over operation without performing software instructions (b), (c) and (d).

9. A radio communication terminal connectable with a plurality of radio communication base stations for radio communication, the terminal comprising:
  first means, when executing a first hand-over operation, on the basis of the qualities of signals received from the radio communication base stations, to finish connections of the radio communication terminal with at least part of the radio communication base stations for radio communication, for storing identifiers of radio communication base station(s), with which the radio communication terminal finished radio communication, and information about the qualities of signals received from said radio communication base station(s) when the radio communication terminal finished radio communication with said radio communication base station(s);
  second means, when executing a second hand-over operation, on the basis of the qualities of signals received from the radio communication base stations, to start communication of the radio communication terminal with at least part of the radio communication base stations for radio communication, for determining whether or not a particular radio communication base station with which the radio communication terminal is about to start communicating, was previously put in radio communication with the radio communication terminal, based on the presence or absence of the identifier of the particular radio communication base station;
  third means, if said second means has determined that the particular radio communication base station was previously put in radio communication with the radio communication terminal, for comparing the quality of a first signal currently received from the particular radio communication base station with the quality of a second signal received from the particular radio communication base station stored in said first means when the radio communication terminal finished the radio communication with the particular radio communication base station; and
  fourth means, if the quality of the first signal is higher than the quality of the second signal by a predetermined level or more, for executing said second hand-over operation in the radio communication terminal to start radio communication with the particular radio communication base station.

10. The radio communication terminal according to claim 9, further comprising:
  fifth means for determining whether or not the quality of the first signal received from the particular radio communication base station exceeds a predetermined threshold level; and
  sixth means for, if said fifth means has determined that the quality of the first signal received from the particular radio communication base station is not greater than the predetermined threshold level, finishing the second hand-over processing without performing the processing of said second, third, and fourth means.

11. A radio communication base station connectable with a radio communication terminal for radio communication, the station comprising:
  first means for, when receiving from the radio communication terminal information about the qualities of signals received from a plurality of radio communication base stations including said radio communication base station and executing a first hand-over operation, on the basis of the information, to finish connections of the radio communication terminal with at least part of the radio communication base stations for radio communication, storing identifiers of radio communication base station(s), with which the radio communication terminal finished radio communication, and information about the qualities of signals received from said radio communication base station(s) when the radio communication terminal finished radio communication with said radio communication base station(s);

second means, when receiving from the radio communication terminal information about the qualities of signals received from a plurality of radio communication base stations including said radio base stations and executing said second hand-over operation, on the basis of the information, to start communication of the radio communication terminal with at least part of the radio communication base stations for radio communication, determining whether or not a particular radio communication base station with which the radio communication terminal is about to start communicating, was previously put in radio communication with the radio communication terminal, based on the presence or absence of the identifier of the particular radio communication base station;

third means for, if said second means has determined that the particular radio communication base station was previously put in radio communication with the radio communication terminal, comparing the quality of a first signal currently received from the particular radio communication base station with the quality of a second signal received from the particular radio communication base station stored in said first means when the radio communication terminal finished radio communication with the particular radio communication base station; and fourth means, if the quality of the first signal is higher than the quality of the second signal by a predetermined level or more, executing the second hand-over operation in the radio communication terminal to start radio communication with the particular radio communication base station.

12. The radio communication base station according to claim 11, further comprising:

fifth means for determining whether or not the quality of the first signal received from the particular radio communication base station exceeds a predetermined threshold level; and sixth means for, if said fifth means has determined that the quality of the first signal received from the particular radio communication base station is not greater than the predetermined threshold level, finishing said second hand-over processing without performing the processing of said second, third, and fourth means.

13. A radio communication system, comprising:

a plurality of radio communication base stations; and a radio communication terminal according to claim 9 or 10 and having a hand-over control capability to control change of connections between said radio communication terminal and said plurality of radio communication base stations for radio communication.

14. A radio communication system, comprising:

a radio communication terminal; and a plurality of radio communication base stations, at least one of which is according to claim 11 or 12, is connectable with the radio communication terminal, and has a hand-over control capability to control a change of connections between said radio communication terminal and said radio communication base stations for radio communication.

* * * * *